(12) United States Patent
Choi

(10) Patent No.: US 8,135,014 B2
(45) Date of Patent: Mar. 13, 2012

(54) UPNP-BASED NETWORK SYSTEM AND CONTROL METHOD THEREOF

(75) Inventor: Cheol-won Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 12/263,692

(22) Filed: Nov. 3, 2008

(65) Prior Publication Data

US 2009/0116479 A1    May 7, 2009

(30) Foreign Application Priority Data

Nov. 5, 2007    (KR) .................. 10-2007-0112099

(51) Int. Cl.
*H04L 12/28*    (2006.01)
(52) U.S. Cl. ........................... 370/392; 709/220
(58) Field of Classification Search .......... 370/392; 709/220
See application file for complete search history.

(56) References Cited

U.S. PATENT DOCUMENTS

| | | | | |
|---|---|---|---|---|
| 7,085,814 | B1* | 8/2006 | Gandhi et al. | 709/208 |
| 2002/0019875 | A1* | 2/2002 | Garrett et al. | 709/230 |
| 2005/0198222 | A1 | 9/2005 | Kohinata et al. | |
| 2005/0198227 | A1* | 9/2005 | Nakama | 709/220 |
| 2006/0067489 | A1 | 3/2006 | Morioka | |
| 2006/0155980 | A1* | 7/2006 | Bodlaender | 713/100 |
| 2007/0104193 | A1 | 5/2007 | Choi | |
| 2007/0124448 | A1* | 5/2007 | Hu | 709/223 |
| 2007/0244578 | A1* | 10/2007 | Stirbu | 700/65 |

FOREIGN PATENT DOCUMENTS

| | | |
|---|---|---|
| EP | 1533976 A2 | 5/2005 |
| KR | 1020060045123 A | 5/2006 |
| WO | 2004/073227 A1 | 8/2004 |
| WO | 2007/089023 A1 | 8/2007 |

* cited by examiner

*Primary Examiner* — Dang Ton
*Assistant Examiner* — Wei Zhao
(74) *Attorney, Agent, or Firm* — Sughrue Mion, PLLC

(57) ABSTRACT

A Universal Plug-and-Play (UPnP)-based network system and a control method thereof are provided. The UPnP-based network system includes a controlled device which transmits an advertisement message, and a control point which receives the transmitted advertisement message. The control point determines whether an extension header included in the advertisement message is changed, and if the extension header is changed, the control point transmits a message for requesting a description file to the controlled device. Also, the UPnP-based network system includes a controlled device which provides a description change advertisement service, and a control point which performs subscription of the description change advertisement service. The control point receives an event message for the description change advertisement service transmitted by the controlled device, and transmits a message for requesting a description file to the controlled device.

17 Claims, 12 Drawing Sheets

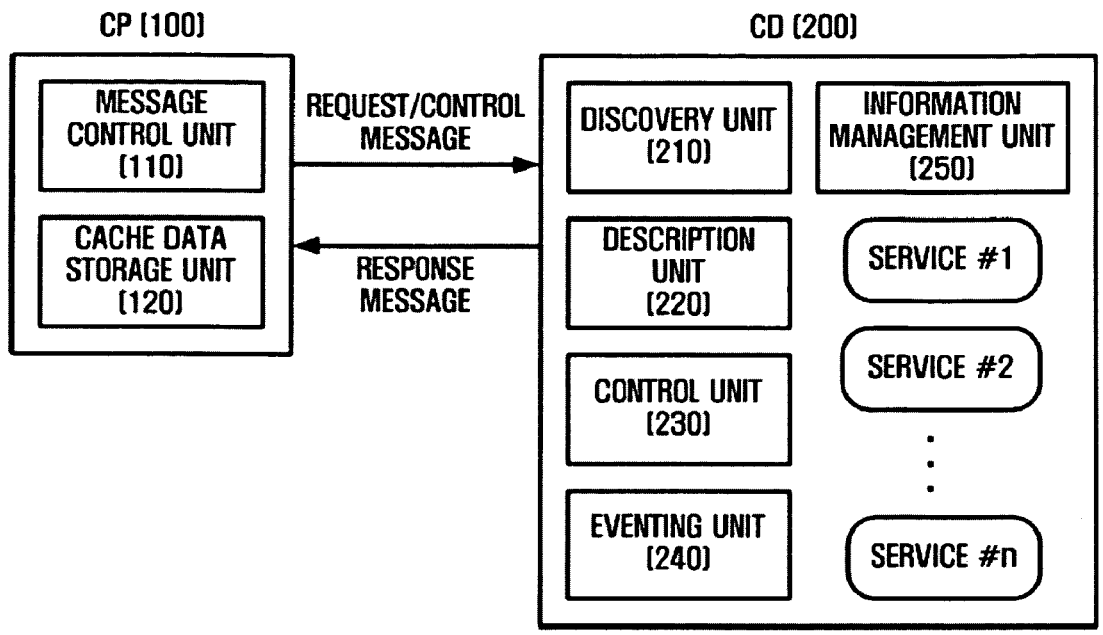

FIG. 8

```
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn:schemas-upnp-org:device:deviceType:v</deviceType>
    <friendlyName>short user-friendly title</friendlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
      <icon>
        <mimetype>image/format</mimetype>
        <width>horizontal pixels</width>
        <height>vertical pixels</height>
        <depth>color depth</depth>
        <url>URL to icon</url>
      </icon>
      XML to declare other icons, if any, go here
    </iconList>
    <serviceList>
      <service>
        <serviceType>urn:schemas-upnp-org:service:ChangingNotify:1</serviceType>
        <serviceId>urn:upnp-org:serviceId:ServiceChangingNotify1</serviceId>
        <SCPDURL>URL to service description</SCPDURL>
        <controlURL>URL for control</controlURL>
        <eventSubURL>URL for eventing</eventSubURL>
      </service>                                                                    ~521

</serviceList>
    <deviceList>
    ...
    </deviceList>
    <presentationURL>URL for presentation</presentationURL>
  </device>
</root>
```

FIG. 9

```xml
<?xml version="1.0"?>
<scpd xmlns="urn:schemas-upnp-org:service-1-0">
  <specVersion>
    <major>1</major>
    <minor>0</minor>
  </specVersion>
  <actionList>
    <action>
      <name>actionName</name>
      <argumentList>
        <argument>
          <name>formalParameterName</name>
          <direction>in xor out</direction>
          <retval />
          <relatedStateVariable>stateVariableName</relatedStateVariable>
        </argument>
        _
      </argumentList>
    </action>
    _
  </actionList>
  <serviceStateTable>
    <stateVariable sendEvents="yes">
      <name>variableName</name>
      <dataType>variable data type</dataType>
      <defaultValue>default value</defaultValue>
      <allowedValueList>
        <allowedValue>enumerated value</allowedValue>
        _
      </allowedValueList>
    </stateVariable>
    <stateVariable sendEvents="yes">
      <name>variableName</name>
      <dataType>variable data type</dataType>
      <defaultValue>default value</defaultValue>
      <allowedValueRange>
        <minimum>minimum value</minimum>
        <maximum>maximum value</maximum>
        <step>increment value</step>
      </allowedValueRange>
    </stateVariable>
    _
  </serviceStateTable>
</scpd>
```

522 (actionList block)
523 (stateVariable blocks)

UPNP-BASED NETWORK SYSTEM AND CONTROL METHOD THEREOF

CROSS-REFERENCE TO RELATED APPLICATION

This application is based on and claims priority from Korean Patent Application No. 10-2007-0112099, filed on Nov. 5, 2007 in the Korean Intellectual Property Office, the disclosure of which is incorporated herein in its entirety by reference.

BACKGROUND OF THE INVENTION

1. Field of the Invention

Systems and methods consistent with the present invention relate to a Universal Plug-and-Play (UPnP)-based network, and, more particularly, to a UPnP-based network system and a control method thereof that can support a dynamic change of a service provided in a mobile network environment.

2. Description of the Prior Art

UPnP is a representative protocol for home networks.

UPnP technology is an architecture for a peer-to-peer connectivity of all types of intelligent products, wireless devices, and personal computers (PCs). UPnP has been designed to be easily used in homes, small offices, public places, ad-hoc networks connected to the Internet, or in an unmanaged networks, to have flexibility, and to provide connectivity based on the standards. UPnP technology provides a distributed open network architecture that enables Transmission Control Protocol (TCP)/Internet Protocol (IP) and Web technology to perform seamless proximity networking. That is, UPnP technology provides connectivity and interoperability among services in a distributed computing environment.

FIG. 1 is a view illustrating the construction of a general home network system.

In a home network, a UPnP-based network system may be logically divided into two parts. One is a controlled device (hereinafter referred to as a "CD") that provides the inherent service of a device and is controlled by a user, and the other is a control point (hereinafter referred to as a "CP") that provides functions capable of controlling home devices. That is, the CP corresponds to a client, and the CD corresponds to a service or a device that provides the service.

As illustrated in FIG. 1, in the home network system, a plurality of UPnP-based network systems 110, 120, 130, 140, and 200 may be connected to one another. For example, a UPnP-based CP may be a computer 110, a personal digital assistant (PDA) or portable phone 120, a printer 130, or a notebook computer 140, and a UPnP-based CD may be a server 200 for providing a service.

The UPnP device architecture defines a communication protocol between the CP and the CD that is controlled by the CP. That is, all devices existing on the home network transmit UPnP protocols for mutual communications.

FIGS. 2A to 2D are views illustrating a communication process between general UPnP-based network systems.

In the UPnP-based network, the communications can be divided into the steps of discovery, description, control, eventing, and presentation.

FIG. 2A shows the UPnP-based discovery step, which can be divided into two processes.

One is a process in which a CD sends device information or service information that can be provided by the CD itself in a multicast method, i.e., a process of transmitting an advertisement message (S10), and the other is a process in which a CP searches for a concerned CD on a home network, i.e., a process of transmitting a search message to the CD (S20). Accordingly, the CP receives a response message in a unicast form from the CD (S30). In contrast, in a step where the CD leaves the home network, the CD sends a bye message in a multicast form to the CP.

FIG. 2B shows the UPnP description step, which is a step in which the CP acquires a device of the CD to be controlled by the CP and description information of a service.

That is, the UPnP requests and receives a device description file (S40 and S45) and a service description file (S50 and S55) of the corresponding CD based on description URL information of the corresponding CD acquired through the discovery step.

FIG. 2C shows the UPnP control step, which is a step of transmitting/receiving a control command between the CP and the CD. In the control step, a response message is provided in response to a request message (S60 and S65).

FIG. 2D shows the UPnP eventing step, which is a step in which the CP receives an event message according to the state change of a service from the CD.

In order for the CP to receive an event message according to the state change of a service from the CD, it should be first registered in the CD through the subscription step (S70 and S75). Then, if the state change of the service provided from the CD or a specified eventing situation is generated, the CD transmits the corresponding event message to the registered CP (S80). In contrast, the CP can set a timeout at the subscription step, and can make a renewal request within the timeout period. In addition, if the CP no longer wants to receive the event message from the CD, it may request cancellation.

However, the related art UPnP-based network system and the control method thereof have the following problems.

Even if the service is dynamically changed such as addition of a new service to the CD, the CP determines only whether a new device is added by confirming a unique device name (UDN) in an advertisement message, and thus it becomes impossible to recognize the addition of a service such as the addition of a new service or deletion of the service. This is because, in the UPnP-based CD, the addition or deletion of a service corresponds to the characteristic of a static home network environment. However, the addition or deletion of a service is required in the mobile network environment, and thus the existing PnP technology has limitations in this regard.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a UPnP-based network system and a control method thereof, which can support a dynamic change of a service provided in a mobile network environment.

According to an aspect of the present invention, there is provided a UPnP-based network system, according to the present invention, which includes a controlled device transmitting an advertisement message; and a control point receiving the transmitted advertisement message; wherein the control point determines whether an extension header included in the advertisement message is changed, and if the extension header is changed, the control point transmits a message for requesting a description file to the controlled device.

According to another aspect of the present invention, there is provided a method of controlling a UPnP-based network system, which includes: a controlled device transmitting an advertisement message; a control point determining whether an extension header included in the advertisement message is changed; and if the extension header is changed as a result of determination, the control point transmitting a message for requesting a description file to the controlled device.

According to still another aspect of the present invention, there is provided a UPnP-based network system, which includes a controlled device providing a description change advertisement service; and a control point performing subscription of the description change advertisement service; wherein the control point receives an event message for the description change advertisement service transmitted by the controlled device, and transmits a message for requesting a description file to the controlled device.

According to still another aspect of the present invention, there is provided a method of controlling a UPnP-based network system, which includes a control point performing subscription of a description change advertisement service provided by a controlled device; the controlled device generating an event message for the description change advertisement service and transmitting the event message to the control point; and the control point, having received the event message, transmitting a message for requesting a description file to the controlled device.

BRIEF DESCRIPTION OF THE DRAWINGS

The above and other aspects of the present invention will be apparent from the following detailed description of exemplary embodiments taken in conjunction with the accompanying drawings, in which:

FIG. 3 is a block diagram illustrating the construction of a UPnP-based network system according to an exemplary embodiment of the present invention;

FIG. 4 is a view illustrating an example of an advertisement message in a UPnP-based network system according to an exemplary embodiment of the present invention;

FIG. 8 is a view illustrating an example of a device description file in a UPnP-based network system according to another exemplary embodiment of the present invention;

FIG. 9 is a view illustrating an example of a service description file in a UPnP-based network system according to another exemplary embodiment of the present invention;

DETAILED DESCRIPTION OF EXEMPLARY EMBODIMENTS

Figure 1:
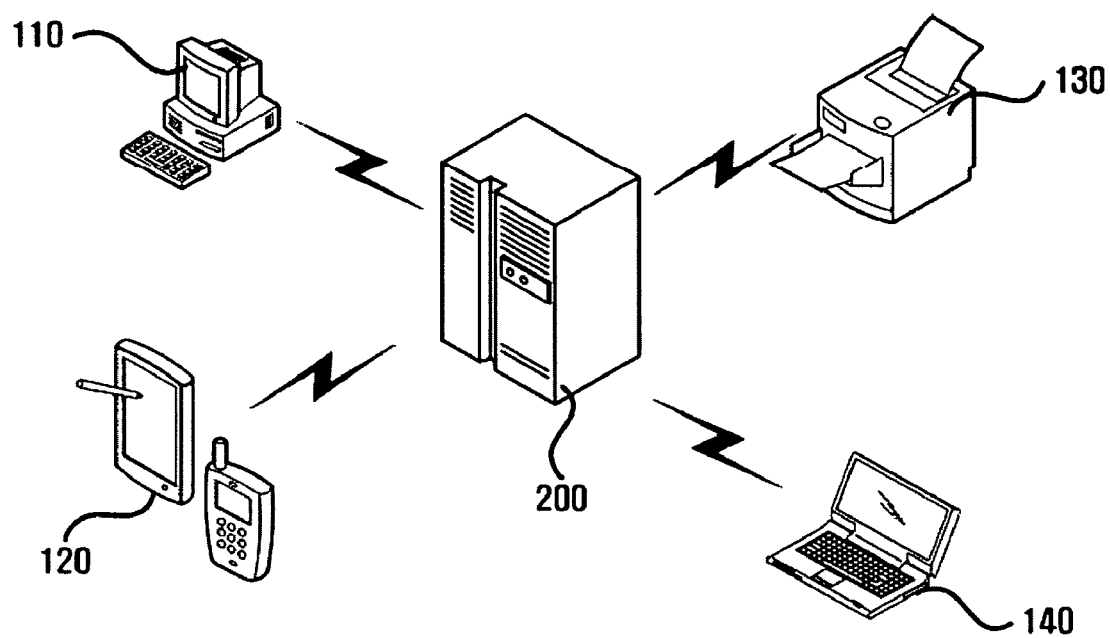
FIG. 1 is a view illustrating the construction of a general home network system.
Figure 2A:
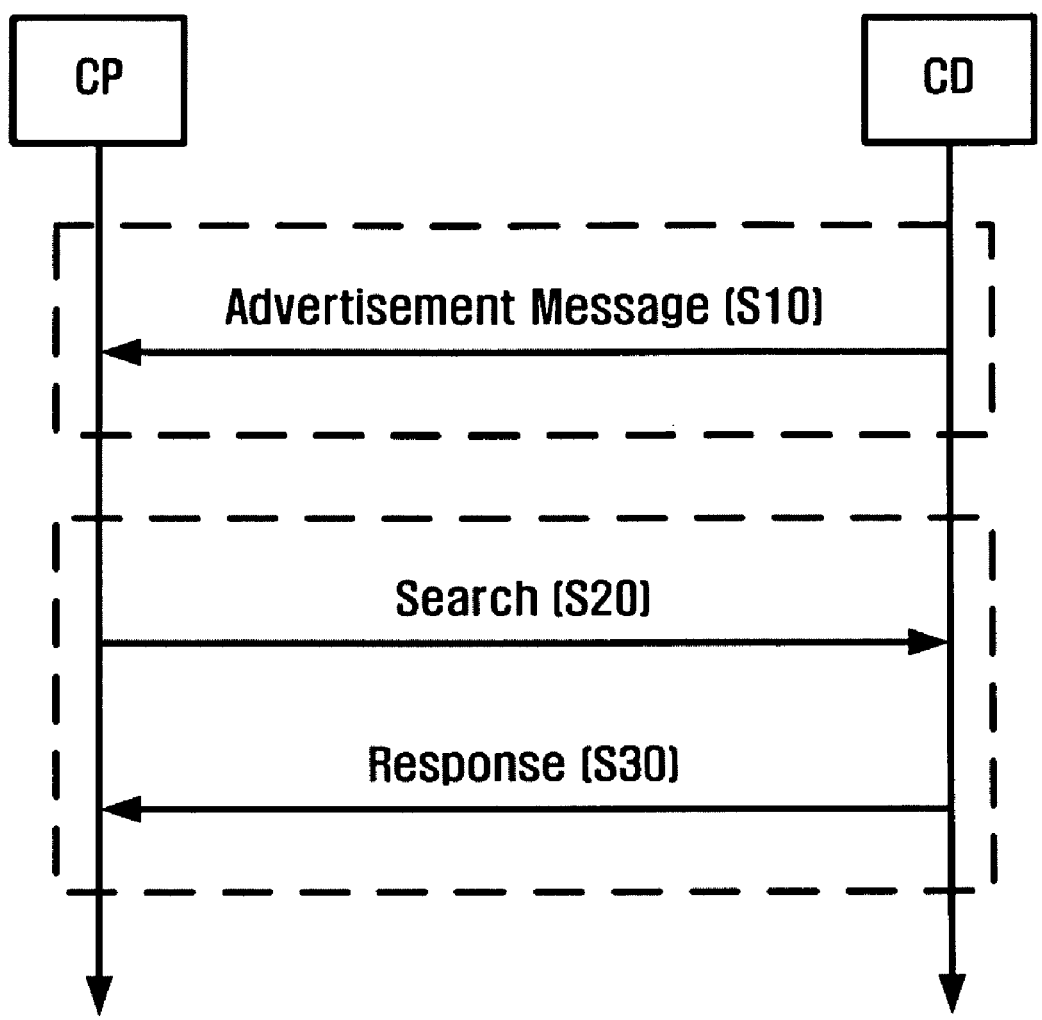
FIGS. 2A to 2D are views illustrating a communication process between general UPnP-based network systems.
Figure 2B:
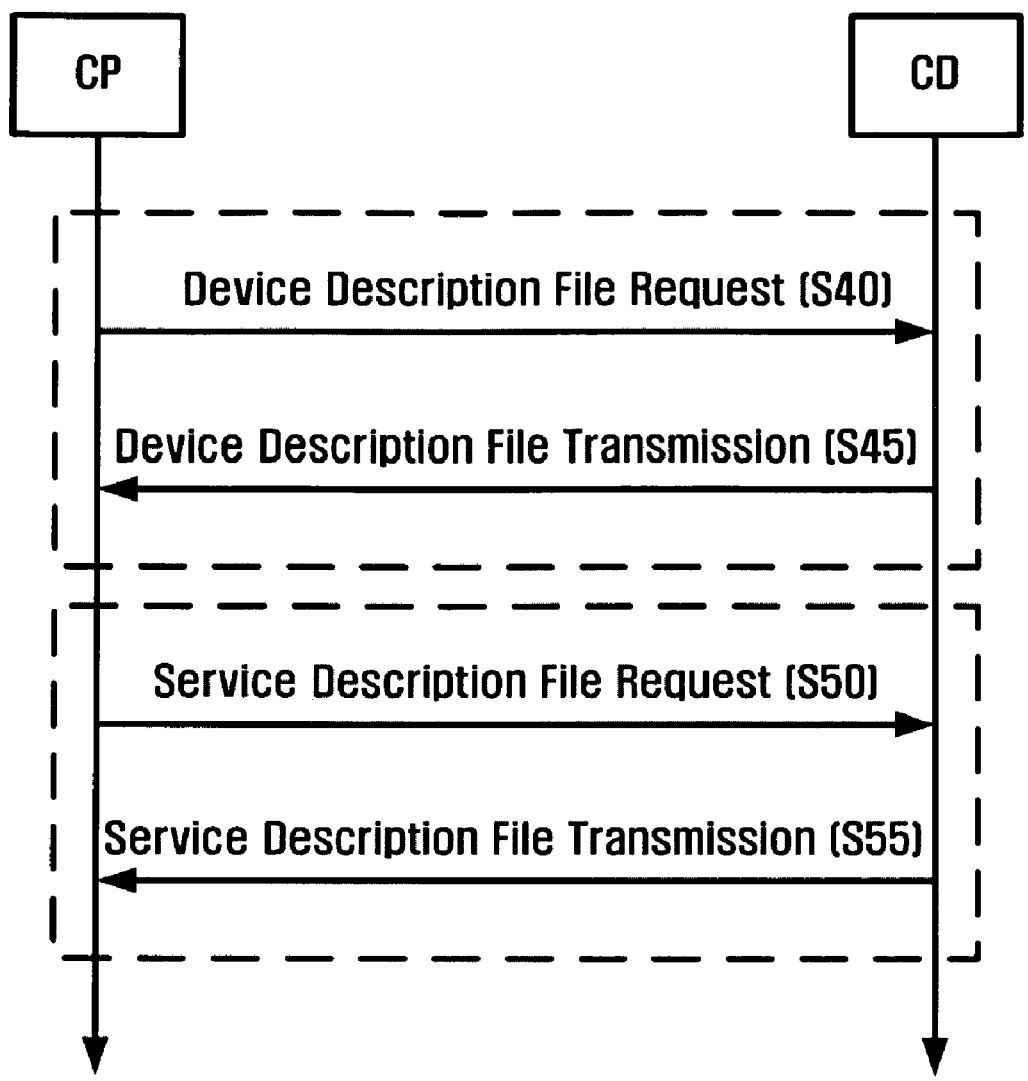
Figure 2C:
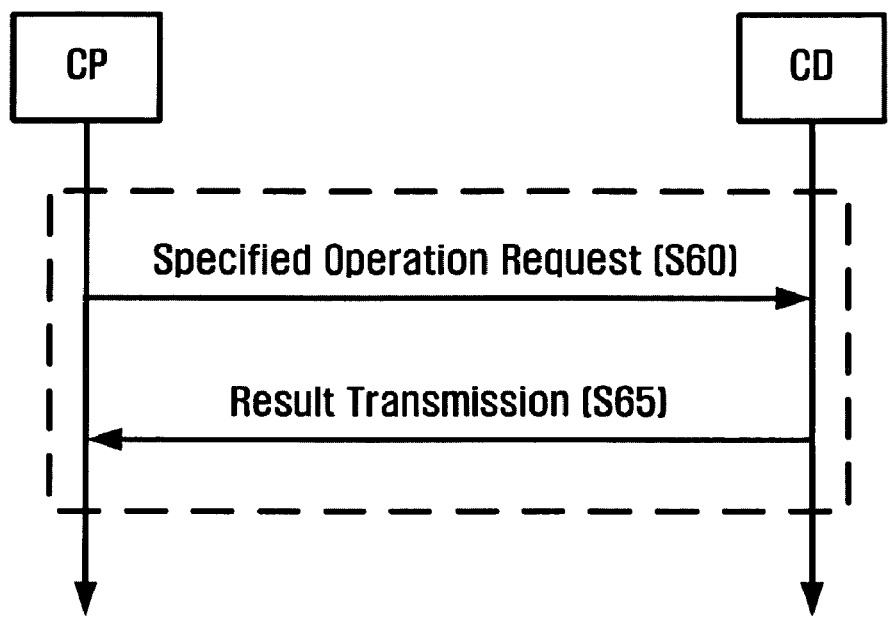
Figure 2D:
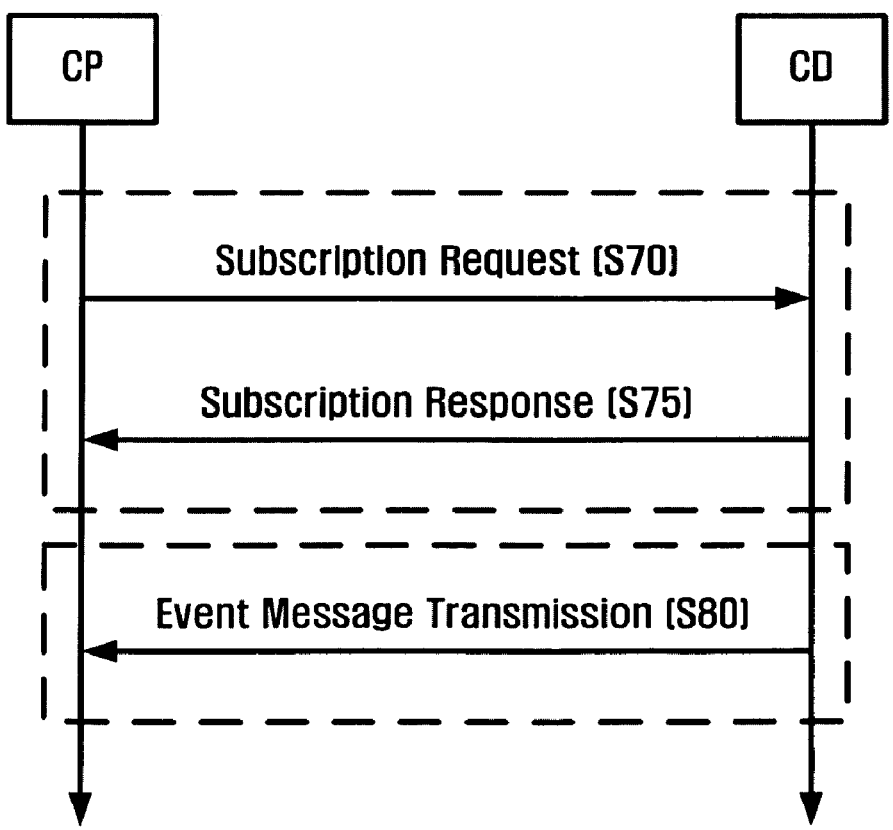

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts for explaining a UPnP-based network system and a control method thereof according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the depicted order. For example, two blocks shown in succession may in fact be executed substantially concurrently or the blocks may sometimes be executed in the reverse order, depending upon the functionality involved.

FIG. 3 is a block diagram illustrating the construction of a UPnP-based network system according to an exemplary embodiment of the present invention.

The UPnP-based network system according to an exemplary embodiment of the present invention includes a control point (CP) 100 and a controlled device (CD) 200.

The CP 100 serves to transmit a message capable of controlling the device.

As illustrated in FIG. 3, the CP 100 includes a message control unit 110 and a cache data storage unit 120.

The message control unit 110 serves to process various types of messages transmitted/received between the CP 100 and the CD 200. Messages that the CP 100 transmits to the CD 200 include a search message, a description request message, a control message, a subscription request message, and so forth, and messages that the CP 100 receives from the CD 200 include an advertisement message, a response message, an event message, and so forth.

In the case of a UPnP-based network system according to an exemplary embodiment of the present invention, the message control unit 110 of the CP 100 recognizes an extension header that is defined in the advertisement message transmitted from the CD 200 in the discovery step. This function will be described in detail in association with a discovery unit 210 of the CD 200 (described later).

The cache data storage unit 120 stores cache data that includes information on the CD 200 transmitted from the CD 200. The information on the CD 200 included in the cache data may be information on the device, information on a service provided from the device, and so forth.

The CD 200 provides an inherent service of the device in accordance with a control message transmitted from the CP 100.

As illustrated in FIG. 3, the CD 200 includes a discovery unit 210, a description unit 220, a control unit 230, an eventing unit 240, and an information management unit 250.

The discovery unit 210 serves to process a discovery message in the CD 200 in the discovery step.

First, the discovery unit 210 transmits an advertisement message that includes device information and service information provided by the discovery unit 210. That is, when the CD 200 takes part in a network, it transmits the advertisement message containing basic information in order to notify the CP 100 of its existence. Here, the basic information includes a URL of description of a device that provides the CD 200, the type of device, an expiration time of a notification message, and so forth. The advertisement message may be transmitted by a multicast method.

The extension header in the advertisement message transmitted from the CD 200 in the discovery step is defined in the UPnP-based network system according to an exemplary embodiment of the present invention.

Generally, although a format of an advertisement message is defined by the standards, the advertisement message can be extended through a user's definition of the additional contents. Accordingly, the discovery unit 210 adds the extension header to the advertisement message, and includes information on the change of a service provided by the CD 200, i.e., information on the addition or deletion of the service, through the extension header.

Thereafter, if a new service is added to the CD 200 or the existing service is deleted from the CD 200, the discovery unit 210 records service addition or deletion information through the extension header defined in the advertisement message. Also, if the advertisement message is transmitted to the CP 100, the message control unit 110 of the CP 100 recognizes the extension header defined in the advertisement message transmitted from the CD 200. Accordingly, in the case where the extension header defined in the advertisement message is changed, the CP 100 recognizes that the service provided from the CD 200 has been changed, and transmits a description request message to the CD 200 in order to receive a device description file and a service description file. In this case, the CD 200 transmits the device description file and the service description file to the CP 100.

FIG. 4 is a view illustrating an example of an advertisement message in a UPnP-based network system according to an exemplary embodiment of the present invention.

As illustrated in FIG. 4, the advertisement message includes a Hypertext Transfer Protocol (HTTP) header containing information on a host, a cache control, a device URL, and so forth. Although the format of the advertisement message is defined as the standards, a user can extend the advertisement message by defining additional contents.

Accordingly, the extension header that includes information on the addition or deletion of a service provided by the CD 200 can be defined in the advertisement message. In FIG. 4, an example of the extension header 211 called "SERVICE-CHANGE" is illustrated. The type of the extension header and information included in the extension header can be changed by those of ordinary skill in the art.

In contrast, the advertisement message having the extension header may be generated at an initial stage where the CD 200 takes part in the network, or the extension header may be added to the standard advertisement message when the service provided from the CD 200 is added or deleted.

In addition, the discovery unit 210 may transmit the advertisement message having the extension header to match the transmission period of a general advertisement message, or may transmit the advertisement message at a time when the service is added or deleted, regardless of the message transmission period.

The CP 100 may transmit a search message for searching for the CD 200 to be used in a multicast method, and the discovery unit 210 may transmit a response message to the CP 100 if it corresponds to the CD 200 that the CP 100 is searching for. This response message may be transmitted by a unicast method.

In contrast, the discovery unit 210 may use the Simple Service Discovery Protocol (SSDP) based on the Hypertext Transfer Protocol (HTTP) header as a dynamic multicast discovery protocol between UPnP devices.

The description unit 220 serves to generate a description file that includes information on a device and service of the CD 200 and to transmit the generated description file to the CP 100. In the UPnP network, a device description file and a service description file determined at the UPnP Forum may be used as the description files.

The device description file is a document including information of the device and information on the service provided by the device, and includes information on a manufacturing company of the device, product information such as a model name and a serial number, and a list of services in the device, and so forth.

In contrast, in the UPnP network, the device description file and the service description file may use an Extensible Markup Language (XML) format.

The control unit 230 processes a command transmitted from the CP 100 in order for the CD 200 to use the service. That is, the control unit 230 serves to generate a response message to the request message of the CP 100 and to transmit the generated response message to the CP 100.

In contrast, in the UPnP network, SOAP may be used as a control messaging protocol.

The eventing unit 240 serves to generate an event message according to the state change of the service provided from the CD 200 and to transmit the generated event message to the CP 100.

If the CP 100 intends to know the state change of the service provided from the CD 200, the CD 200 generates and transmits a subscription request message to the eventing URL included in the information on the CD 200 that is acquired at the discovery step. This step is called a subscription step. Thereafter, the CD 200 registers the CP 100 that has sent a registration request message, and if the state change of the service provided from the CD 200 or a specified eventing situation is generated, the CD 200 transmits the corresponding event message to the registered CP 100.

In contrast, in the UPnP network, Generic Event Notification Architecture (GENA) based on the HTTP header may be used as a protocol for the eventing step of the device.

The information management unit 250 serves to store and manage service information provided by the CD 200. At this time, the service information provided by the CD 200 may be stored in the form of a list. Also, the information management unit 250 can continuously update the service information list in accordance with the request transmitted from the CP 100.

As described above, the UPnP-based network system may have a function of the CP 100 or the CD 200, or may have both functions of the CP 100 and the CD 200.

Hereinafter, a method of controlling an UPnP-based network system as constructed above according to an exemplary embodiment of the present invention will be described.

Figure 5:
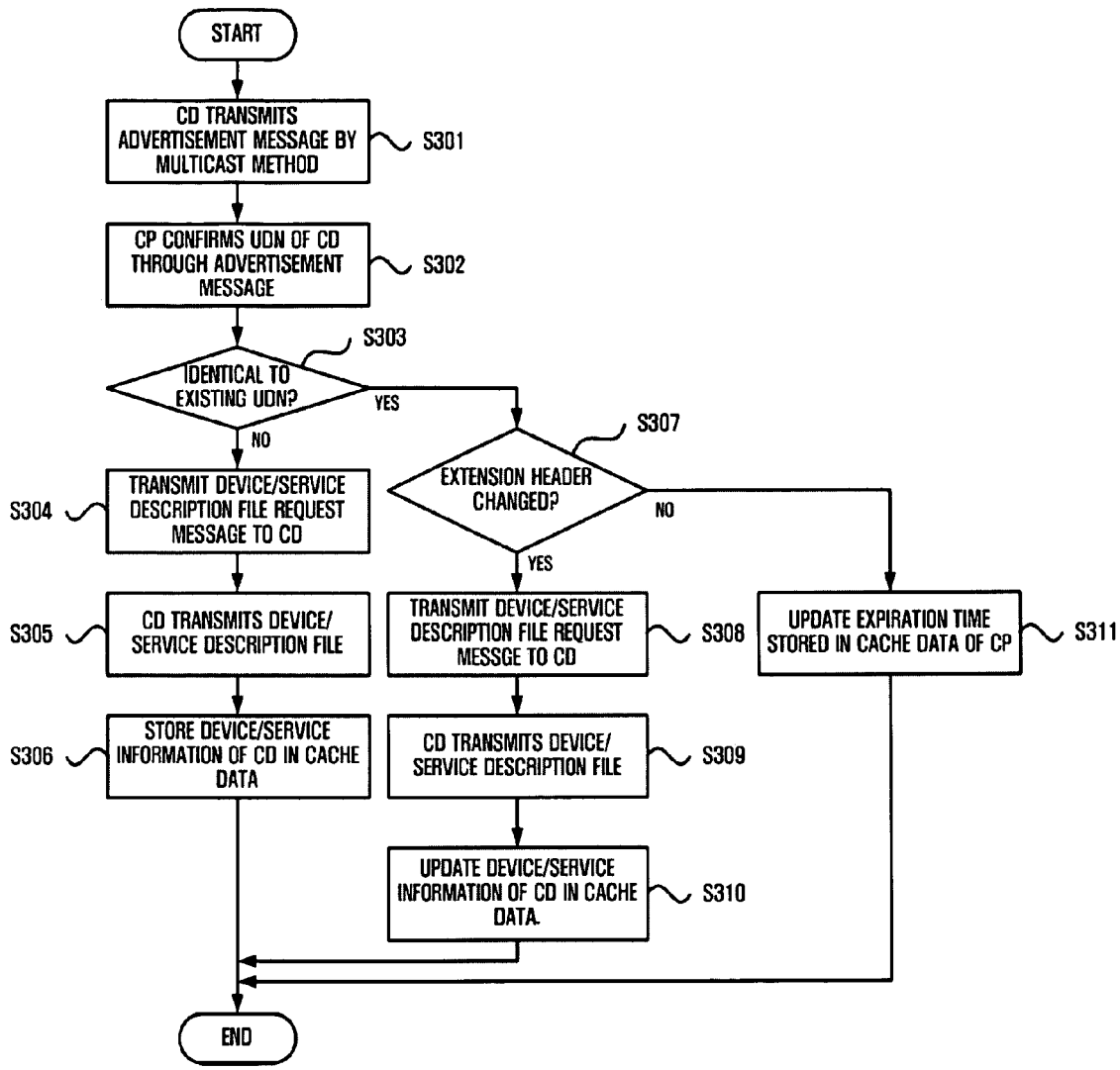
FIG. 5 is a flowchart illustrating a process of recognizing addition or deletion of a service in a UPnP-based network system according to an exemplary embodiment of the present invention.

FIG. 5 is a flowchart illustrating a process of recognizing addition or deletion of a service in a UPnP-based network system according to an exemplary embodiment of the present invention.

First, for a predetermined period, the UPnP-based CD 200 transmits an advertisement message including its device information and service information that can be provided by the CD itself in a multicast method (S301). The advertisement message is in the form of an SSDP.

At this time, the UPnP-based CP 100 receives the advertisement message, confirms the UDN of the CD 200 (S302), and then determines whether the CD, having sent the message, is identical to the existing CD 200 (S303).

If the CP 100 determines that the CD 200, having sent the message, is a new CD 200 through the confirmation of the UDN in operation S303, the CP 100 transmits a description request message, i.e., an HTTP GET message to the CD 200 in order to receive a device description file and a service description file (S304). At this time, the CP 100 transmits the description request message through description URL information included in the advertisement message. Then, the CD 200 transmits the device description file and the service description file in XML format to the CP 100 in response to the description request message (S305).

Then, the CP 100 stores the device information and the service information of the CD 200 in the cache data storage unit 120 by parsing the received device description file and service description file in XML format (S306).

If the CP 100 determines that the CD 200, having sent the message, is identical to the existing CD 200 through the confirmation of the UDN in operation S303, the CP 100 determines whether the extension header defined in the advertisement message is changed (S307).

If the extension header defined in the advertisement message is changed in operation S307, the CP 100 transmits the description request message to the CD 200 in order to receive the device description file and the service description file (S308). Then, the CD 200 transmits the device description files and the service description file in XML format to the CP 100 in response to the description request message (S309).

Thereafter, the CP 100 updates the device information and the service information of the CD 200 by parsing the received device description file and service description file in XML format (S310).

If it is determined that the extension header defined in the advertisement message is not changed in operation S307, the CP 100 does not download the device description file and the service description file of the corresponding CD 200, but performs only updating of the expiration time of the CD 200 stored in the cache data storage unit 120 (S311).

As described above, in the UPnP-based network system according to an exemplary embodiment of the present invention, the addition or deletion of the service can be recognized by defining the extension header in the advertisement message transmitted in the discovery step.

Figure 6:
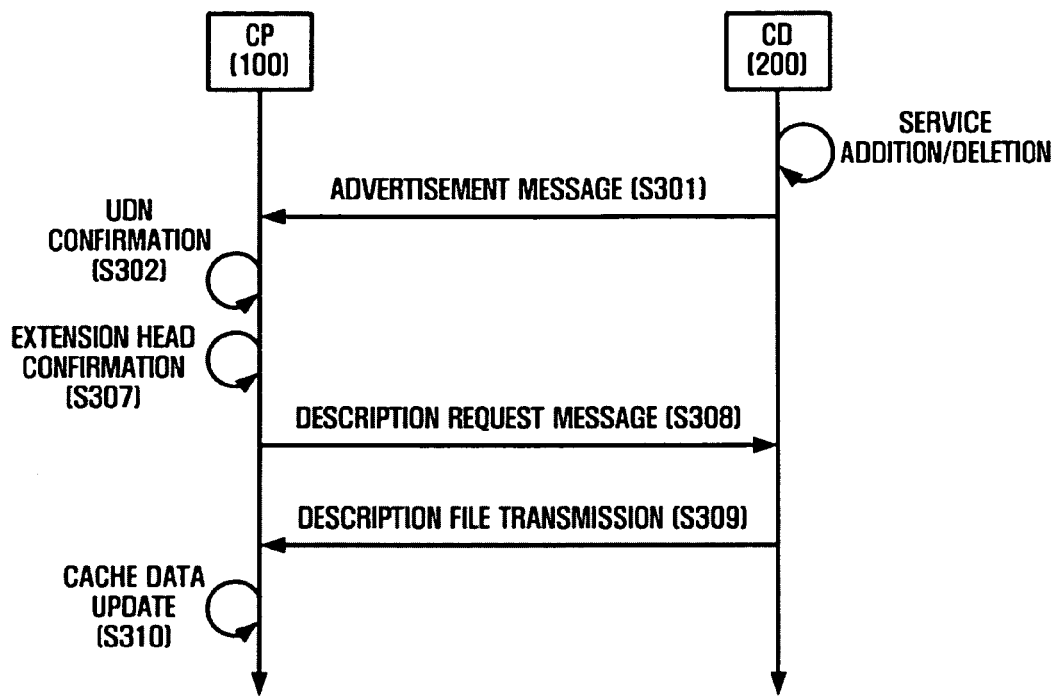
FIG. 6 is an exemplary view explaining that the UPnP-based network system of FIG. 5 recognizes addition or deletion of a service in a discovery step according to an exemplary embodiment of the present invention.

FIG. 6 is an exemplary view explaining that the UPnP-based network system of FIG. 5 recognizes addition or deletion of a service at a discovery step according to an exemplary embodiment of the present invention.

In FIG. 6, it is exemplified that the extension header defined in the advertisement message transmitted by the CD 200 is changed after the addition or deletion of the service. Even though the CP 100 determines that the CD 200 is identical to the existing CD 200 through the confirmation of the UDN (S302), the CP 100 can confirm the change of the extension header defined in the advertisement message (S307), and request and receive the device description file and the service description file from the CD 200 (S308 and S309).

Figure 7:
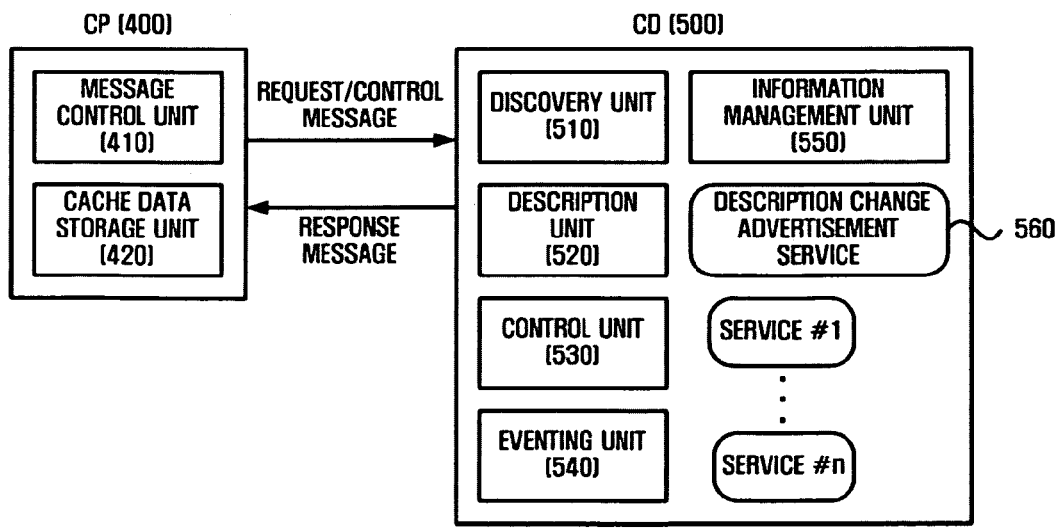
FIG. 7 is a block diagram illustrating the construction of a UPnP-based network system according to another exemplary embodiment of the present invention.

FIG. 7 is a block diagram illustrating the construction of a UPnP-based network system according to another exemplary embodiment of the present invention.

The UPnP-based network system according to another exemplary embodiment of the present invention includes a CP 400 and a CD 500.

As described above with reference to FIG. 3, the CP 400 includes a message control unit 410 and a cache data storage unit 420. That is, the message control unit 410 serves to process various types of messages transmitted from the CP 400 to the CD 500, and the cache data storage unit 420 serves to store cache data that includes information on the CD 500 transmitted from the CD 500.

In the case of the UPnP-based network system according to another exemplary embodiment of the present invention, the message control unit 410 of the CP 400 is preset to request subscription of a description change advertisement service 560 included in the advertisement message transmitted from the CD 500 at the discovery step. This function will be described in detail in association with a description unit 520 of the CE 500 to be described later.

The cache data storage unit 420 serves to store cache data that includes information on the CD 200 transmitted from the CD 200. The information on the CD 200 included in the cache data may be information on the device, information on a service provided from the device, and so forth.

Also, the CD 500 includes a discovery unit 510, a description unit 520, a control unit 530, an eventing unit 540, and an information management unit 550. The control unit 530 and the information management unit 550 constituting the CD 500 of the UPnP-based network system according to another exemplary embodiment of the present invention are the same as those as described above with reference to FIG. 3, and thus the detailed description thereof will be omitted.

The discovery unit 510 serves to process a discovery message in the CD 500 in the discovery step.

First, the discovery unit 510 transmits an advertisement message that includes device information and service information that can be provided by the discovery unit 510. This advertisement message may be transmitted by a multicast method.

In contrast, the CP 400 transmits a response message in response to a search message for searching for the CD 500 to be used by the CP 400.

The description unit 520 serves to generate a description file that includes information on a device and service of the CD 500 and to transmit the generated description file to the CP 400. In the UPnP network, a device description file and a service description file determined at the UPnP Forum may be used as the description files.

In the UPnP-based network system according to another exemplary embodiment of the present invention, the CD 500 provides a description change advertisement service 560. The description change advertisement service is a basic service provided by the CD 500, which recognizes the addition or deletion of another service provided by the CD 500, generates an event message, and notifies the CP 400 of the generated event message.

When the CD 500 takes part in the network, it transmits the advertisement message containing basic information in order to notify the CP 400 of its existence, and the advertisement message may include information on the description change advertisement service 560.

Also, the message control unit 410 of the CP 400 is preset to request subscription of the description change advertisement service 560 included in the advertisement message transmitted by the CD 500 in the discovery step.

Accordingly, the CP 400 stores device information and service information of the CD 500 in the cache data storage unit 420 by parsing the received device description file and service description file in XML format.

At this time, the CP 400 can recognize information on the description change advertisement service included in the device description file and the service description file.

FIG. 8 is a view illustrating an example of a device description file in a UPnP-based network system according to another exemplary embodiment of the present invention.

As illustrated in FIG. 8, a device description file in XML format includes information on a service type, a service ID, a service description URL, a control URL, and an eventing URL in the <service> tag. The device description file also includes information on a UPnP Forum, defined services, and services added by a UPnP vendor in the <serviceList> tag.

Accordingly, information on the description change advertisement services 560 and 521 is additionally defined in the <serviceList> tag of the device description file. In FIG. 8, it is exemplified that the description change advertisement services 560 and 521 are additionally defined as "ChangeNotify" type services. In defining the description change advertisement services 560 and 521, information on a service type, a service ID, a service description URL, a control URL, an eventing URL, and so forth, can be changed by those of ordinary skill in the art.

FIG. 9 is a view illustrating an example of a service description file in a UPnP-based network system according to another exemplary embodiment of the present invention.

As illustrated in FIG. 9, a service description file of an XML format includes a list of actions that are commands for service responses in <actionList> tag, and information on arguments that are parameters of the respective actions in <action> tag. Also, the service description file includes related state variables in <serviceStateTable> tag. The service description file may additionally include a UPnP Forum, defined services, or actions added by the UPnP vendor in the <actionList> tag, and includes a UPnP Forum, defined services, or state variables in the <service StateTable> tag.

Accordingly, actions 522 for the description change advertisement service 560 and related state variable information 523 can be additionally defined in <actionList> and <serviceStateTable> tags of the device description file. This information can be changed by those of ordinary skill in the art.

The eventing unit 540 serves to generate an event message according to the state change of the service provided by the CD 500, and to transmit the generated event message to the CP 400.

If the CP 400 intends to know the state change of the service provided by the CD 500 to be used by the CP 400, the CD 500 generates and transmits a subscription request message to the eventing URL included in the information on the CD 500 acquired in the discovery step. This step is called a subscription step. Thereafter, the CD 500 registers the CP 400 that has sent a registration request message, and if the state change of the service provided from the CD 500 or a specified eventing situation is generated, it transmits the corresponding event message to the registered CP 400.

In contrast, in the UPnP network, GENA (Generic Event Notification Architecture) based on the HTTP header may be used as a protocol for the eventing step of the device.

As described above, the UPnP-based network system may have a function of the CP 400 or the CD 500, or may have both functions of the CP 400 and the CD 500.

Hereinafter, a method of controlling an UPnP-based network system as constructed above according to another exemplary embodiment of the present invention will be described.

Figure 10A:
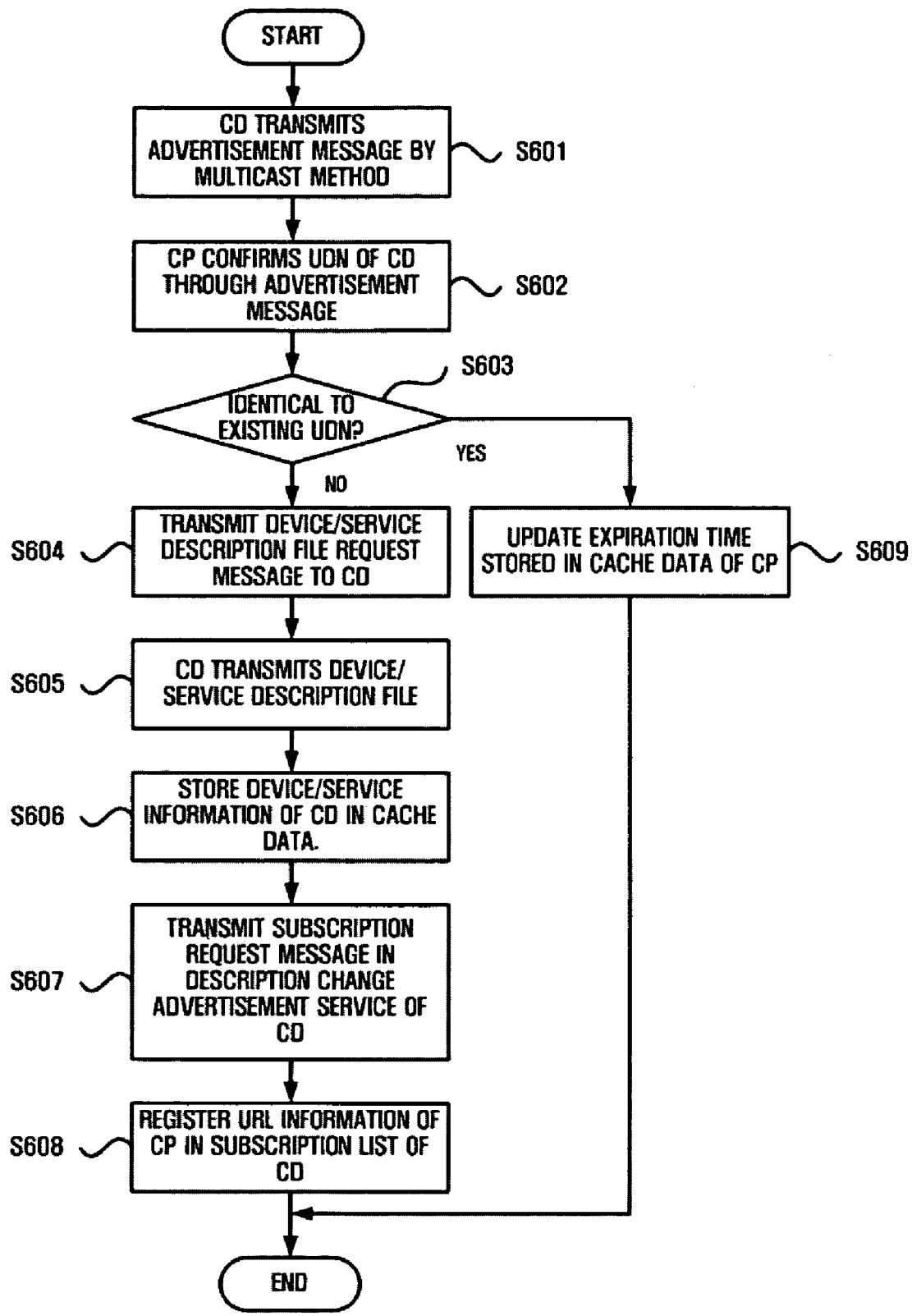
FIGS. 10A and 10B are flowcharts illustrating a process of recognizing addition or deletion of a service in a UPnP-based network system according to another exemplary embodiment of the present invention.
Figure 10B:
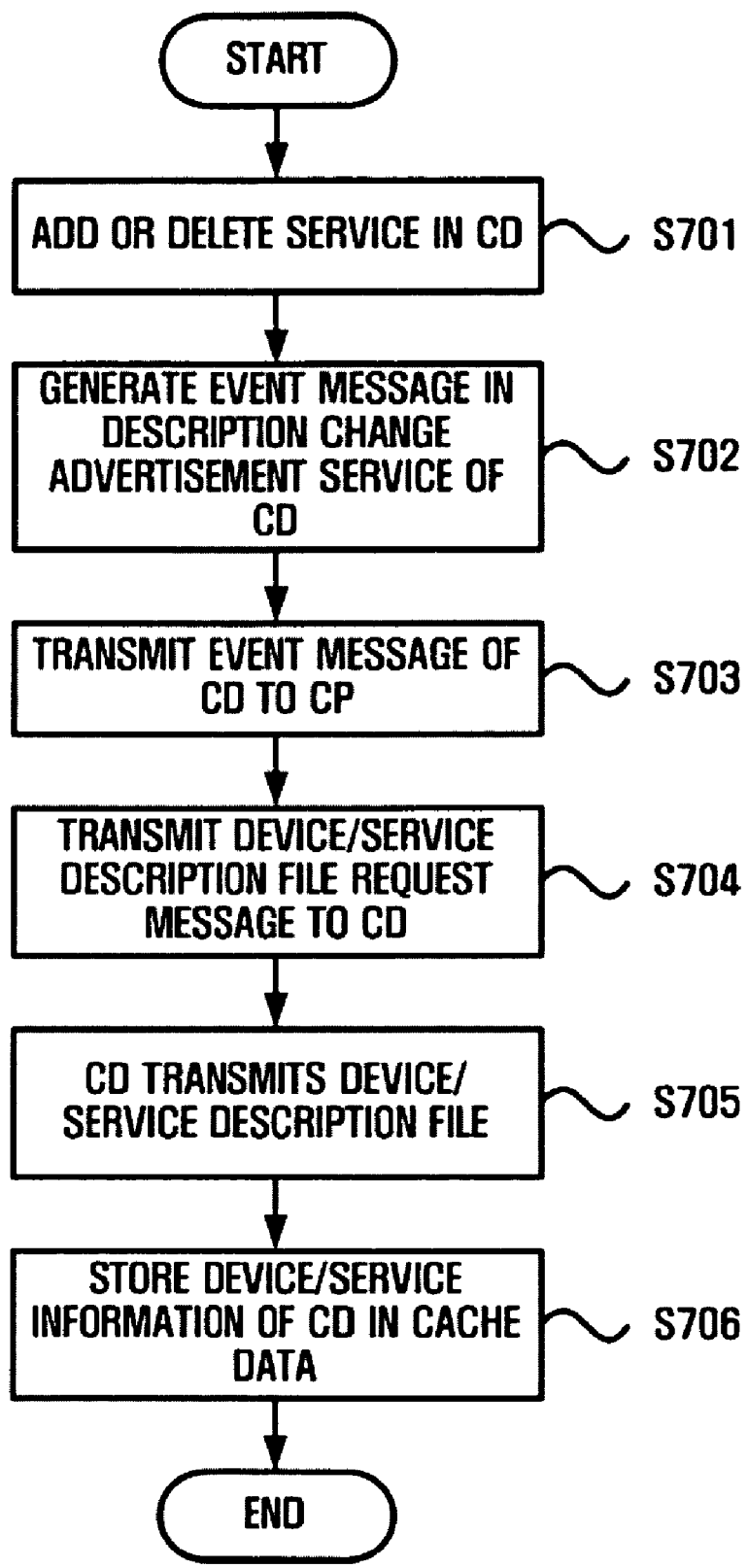

FIGS. 10A and 10B are flowcharts illustrating a process of recognizing addition or deletion of a service in a UPnP-based network system according to another exemplary embodiment of the present invention.

FIG. 10A shows a process in which the CP requests a subscription to the CD in order to use the description change advertisement service.

First, for a predetermined period, the UPnP-based CD 500 transmits an advertisement message including its device information and service information that can be provided by the CD itself in a multicast method (S601). At this time, The UPnP-based CP 400 receives the advertisement message, confirms the UDN of the CD 500 (S602), and then determines whether the CD, having sent the message, is identical to the existing CD 500 (S603).

If the CP 400 determines that the CD 500, having sent the message, is a new CD 500 through the confirmation of the UDN in operation S603, the CP 400 transmits a description request message to the CD 500 in order to receive a device description file and a service description file (S604). In this case, the CD 500 transmits the device description file and the service description file of an XML format to the CP 400 in response to the description request message (S605). Then, the CP 400 stores device information and service information of the CD 500 in the cache data storage unit 420 by parsing the received device description file and service description file in XML format (S606). At this time, the CP can recognize information on the description change advertisement service included in the device description file and the service description file.

Then, the CP 400 transmits an event subscription request message to the CD 500 in order to use the description change advertisement service defined in the device description file transmitted from the CD 500 (S607). The subscription request message is a message in XML format that uses the GENA protocol. The CD 500 registers the URL information of the CP 400, having transmitted the subscription request message, in its own subscription list (S608). Accordingly, if the addition or deletion of a service occurs in the CD 500, the event message is transmitted to the CP 400.

If the CP 400 determines that the CD 500, having sent the message, is identical to the existing CD 500 through the confirmation of the UDN in operation S603, it does not download the device description file and the service description file of the corresponding CD 500, but performs only the updating of the expiration time of the CD 500 stored in the cache data storage unit 420 (S609).

FIG. 10B shows a process in which the CP recognizes the addition or deletion of a service when the service is added to or deleted from the CD.

If a new service is added to the CD 500 or the existing service is deleted (S701), an event message according to the addition or deletion of the service is generated through the description change advertisement service basically provided in the CD 500 (S702).

The CD 500 transmits the event message according to the addition or deletion of the service to the CP 400 (S703). At this time, the CP 400, having received the event message, is the CP 400 registered in the CD 500 through the subscription request in the description change advertisement service of the CD 500.

The CP 400, having received the event message, transmits the description request message to the CD 500 in order to receive the device description file and the service description file (S704). Then, the CD 500 transmits the device description file and the service description file of XML format to the CP 400 in response to the description request message (S705). Then, the CP 400 stores the device information and the service information of the CD 500 in the cache data storage unit 420 by parsing the received device description file and service description file of XML format (S706).

As described above, according to the UPnP-based network system according to another exemplary embodiment of the present invention, the description change advertisement service 560 is basically provided to the CD 500, and the CP 400 can recognize the addition or deletion of the service by defining the description change advertisement service 560 in the device description file and the service description file of XML format transmitted from the CD 500 in the description step and by adding actions, factors, and related state variables for the service.

Figure 11A:
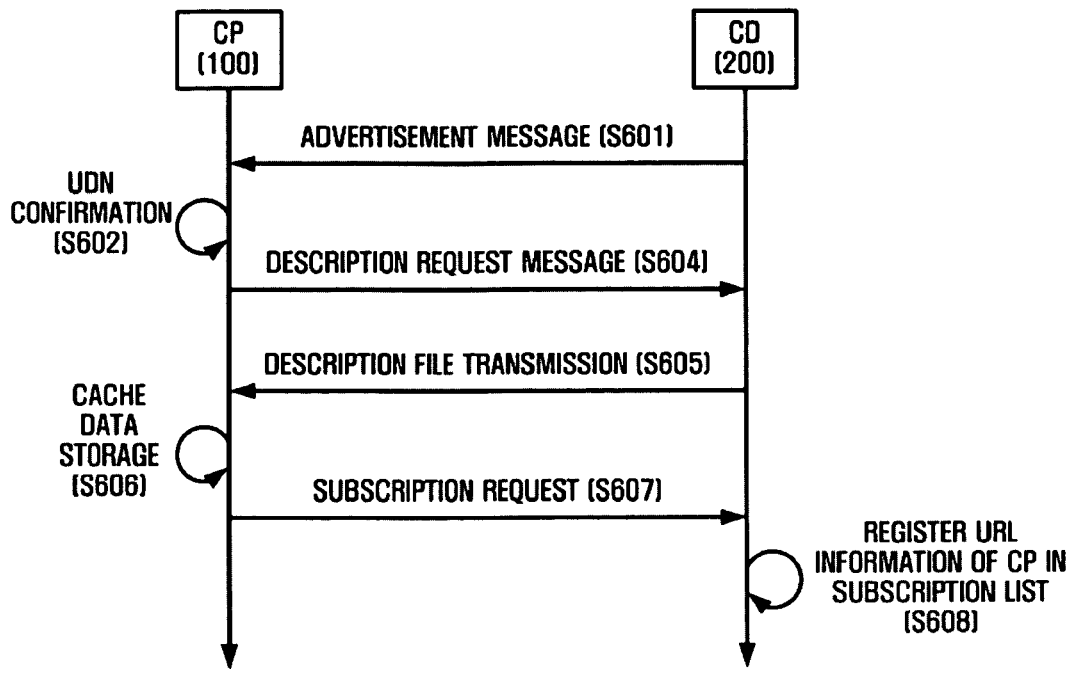
FIGS. 11A and 11B are exemplary views explaining that a UPnP-based network system of FIG. 10 recognizes addition or deletion of a service in a description step according to another exemplary embodiment of the present invention.
Figure 11B:
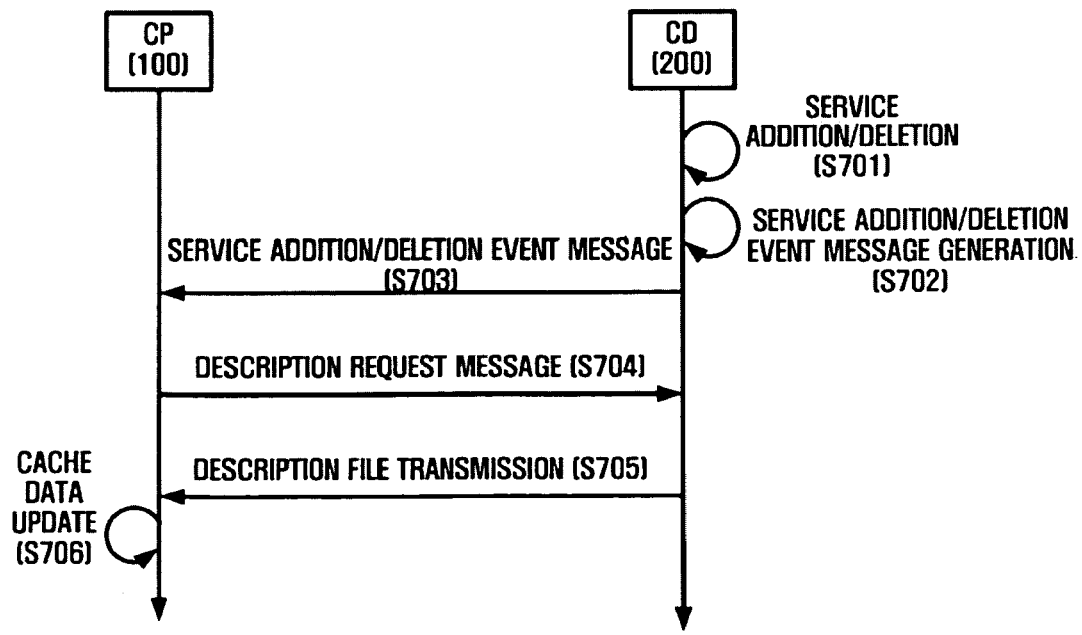

FIGS. 11A and 11B are exemplary views explaining that the UPnP-based network system of FIG. 10 recognizes the addition or deletion of a service at the description step according to another exemplary embodiment of the present invention.

FIG. 11A shows an example of requesting a subscription to the CD 500 in order for the CP 400 to use the description change advertisement service. That is, the CP 400 receives the device description file and the service description file (S605) by transmitting the description request message to the CD 500 (S604), and then transmits the event subscription request message to the CD 500 in order to use the description change advertisement service defined in the device description file (S607).

FIG. 11B shows an example of generating a service addition or deletion event message in the description change advertisement service 560 of the CD 500 and transmitting the generated message to the CP 400 after the service is added or deleted. That is, if the service is added or deleted in the CD 500 (S701), the CD 500 generates an event message in the description change advertisement service (S702), and transmits the generated event message to the CP 400 (S703). The CP 400 transmits the description request message to the CD 500 (S704), and receives the device description file and the service description file (S705).

According to the related art UPnP-based network system, even though the service is dynamically changed such as addition of a new service to the CD, the CP determines only whether a new device is added by confirming a UDN in an advertisement message, and thus it becomes impossible to recognize the addition of a service such as the addition of a new service or deletion of the service. This is because, in the UPnP-based CD, the addition or deletion of a service corresponds to the characteristic of a static home network environment. However, the addition or deletion of a service is required in the mobile network environment, and thus the existing PnP technology has limitations in this regard.

However, according to the UPnP-based network system according to an exemplary embodiment of the present invention, the CD 200 records information on the addition or deletion of a service in an extension header defined in a transmitted advertisement message, and the CP 100 recognizes such information, so that the addition or deletion of the service that is provided in a mobile network environment can be supported.

Also, according to the UPnP-based network system according to another exemplary embodiment of the present invention, the description change advertisement service 560 is basically provided to the UPnP-based CD 500, and the CP 400 can recognize the addition or deletion of the service by defining the description change advertisement service 560 in the device description file and the XML service description file transmitted from the CD 500 at the description step and by adding actions, factors, and related state variables for the service. Accordingly, the addition or deletion of the service provided in a mobile network environment can be supported.

In the exemplary embodiments of the present invention, the term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and modules may be implemented so as to execute one or more CPUs in a device.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A Universal Plug-and-Play (UPnP)-based network system comprising:
   a control point which stores a unique device name (UDN) of a controlled device; and
   the controlled device which transmits an advertisement message including the UDN of the controlled device, wherein the control point receives the advertisement message transmitted by the controlled device and determines that the controlled device is a previously existing controlled device in the UPnP-based network system based on the stored UDN and the UDN included in the advertisement message, wherein the control point determines whether an extension header included in the advertisement message is changed, and if it is determined that the extension header is changed, the control point transmits a message requesting a description file to the previously existing controlled device, wherein the extension header comprises information on a change of a service provided by the previously existing controlled device, wherein the change of a service comprises a new service being added to the previously existing controlled device and an existing service of the previously existing controlled device being deleted, wherein the previously existing controlled device transmits the advertisement message in response to an update to the extension header.

2. The UPnP-based network system of claim 1, wherein the description file comprises:
   a device description file including information on the previously existing controlled device; and
   a service description file including information on a service provided by the previously existing controlled device.

3. The UPnP-based network system of claim 2, wherein the description file uses an extensible markup language (XML) format.

4. The UPnP-based network system of claim 1, wherein the advertisement message uses a Simple Service Discovery Protocol (SSDP) based on a Hypertext Transfer Protocol (HTTP) header.

5. A Universal Plug-and-Play (UPnP)-based network system comprising:
   a controlled device which provides a description change advertisement service and a unique device name (UDN) of the controlled device; and
   a control point which stores the UDN of the controlled device and performs subscription of the description change advertisement service;
   wherein the control point receives an event message, including the UDN of the controlled device, for the description change advertisement service transmitted by the controlled device, determines that the controlled device is a previously existing controlled device in the UpnP-based network system based on the stored UDN and the UDN included in the event message, and transmits a message for requesting a description file to the previously existing controlled device,
   wherein the previously existing controlled device generates the event message for the description change advertisement service if a service provided by the previously existing controlled device is changed, wherein the service provided by the previously existing controlled device being changed comprises a new service being added to the previously existing controlled device and an existing service of the previously existing controlled device being deleted,
   wherein the previously existing controlled device transmits the event message in response to an update to services provided by the controlled device.

6. The UPnP-based network system of claim 5, wherein the control point transmits a subscription request message for the description change advertisement service, and the controlled device registers Uniform Resource Locator (URL) information of the control point in a subscription list of the controlled device.

7. The UPnP-based network system of claim 5, wherein the description file comprises:
   a device description file including information on the previously existing controlled device; and
   a service description file including information on the service provided by the previously existing controlled device.

8. The UPnP-based network system of claim 7, wherein the description file uses an Extensible Markup Language (XML) format.

9. A method of controlling a Universal Plug-and-Play (UPnP)-based network system, the method comprising:
   storing, at a control point, a unique device name (UDN) of a controlled device;
   transmitting an advertisement message including the UDN of the controlled device from the controlled device;
   determining, at the control point, that the controlled device is a previously existing controlled device in the UPnP-based network system based on the stored UDN and the UDN included in the advertisement message;
   determining, at the control point, whether an extension header included in the advertisement message transmitted from the previously existing controlled device is changed; and
   if it is determined that the extension header is changed, transmitting a message for requesting a description file from the control point to the previously existing controlled device,
   wherein the extension header comprises information on a change of a service provided by the previously existing controlled device, wherein the change of a service comprises a new service being added to the previously existing controlled device and an existing service of the previously existing controlled device being deleted,
   wherein the previously existing controlled device transmits the advertisement message in response to an update to the extension header.

10. The method of claim 9, wherein the description file comprises:
    a device description file including information on the previously existing controlled device; and
    a service description file including information on the service provided by the previously existing controlled device.

11. The method of claim 10, wherein the description file uses an Extensible Markup Language (XML) format.

12. The method of claim 9, wherein the advertisement message uses a Simple Service Discovery Protocol (SSDP) based on a Hypertext Transfer Protocol (HTTP) header.

13. A method of controlling a Universal Plug-and-Play (UPnP)-based network system, the method comprising:
    storing, at a control point, a unique device name (UDN) of a controlled device received from the controlled device;
    performing, at the control point, subscription of a description change advertisement service provided by a controlled device;
    generating, at the controlled device, an event message, including the UDN of the controlled device, for the description change advertisement service and transmitting the event message to the control point;
    determining, at the control point, that the controlled device is a previously existing controlled device in the UPnP-based network system based on the stored UDN and the UDN included in the event message and transmitting a message for requesting a description file from the control point, having received the event message, to the previously existing controlled device, wherein the event message is generated for the description change advertisement service by the previously existing controlled device if a service provided by the previously existing controlled device is changed, wherein the service provided by the previously existing controlled device being changed comprises a new service being added to the previously existing controlled device and an existing service of the previously existing controlled device being deleted, wherein the previously existing controlled device transmits the event message in response to an update to services provided by the controlled device.

14. The method of claim 13, wherein the performing the subscription of the description change advertisement service comprises:

transmitting a subscription request message for the description change advertisement service from the control point; and registering, at the controlled device, uniform resource locator (URL) information of the control point in a subscription list of the controlled device.

15. The method of claim 13, wherein the description file comprises:

a device description file including information on the previously existing controlled device; and a service description file including information on the service provided by the previously existing controlled device.

16. The method of claim 15, wherein the description file uses an Extensible Markup Language (XML) format.

17. The UPnP-based network system of claim 1, wherein the control point determines that the controlled device is the previously existing controlled device in the UPnP-based network system if the UDN included in the advertisement message is identical to the stored UDN.

* * * * *